June 29, 1954 K. K. KEARBY 2,682,565
METHOD OF POLYMERIZING OLEFINS
Filed Jan. 6, 1951
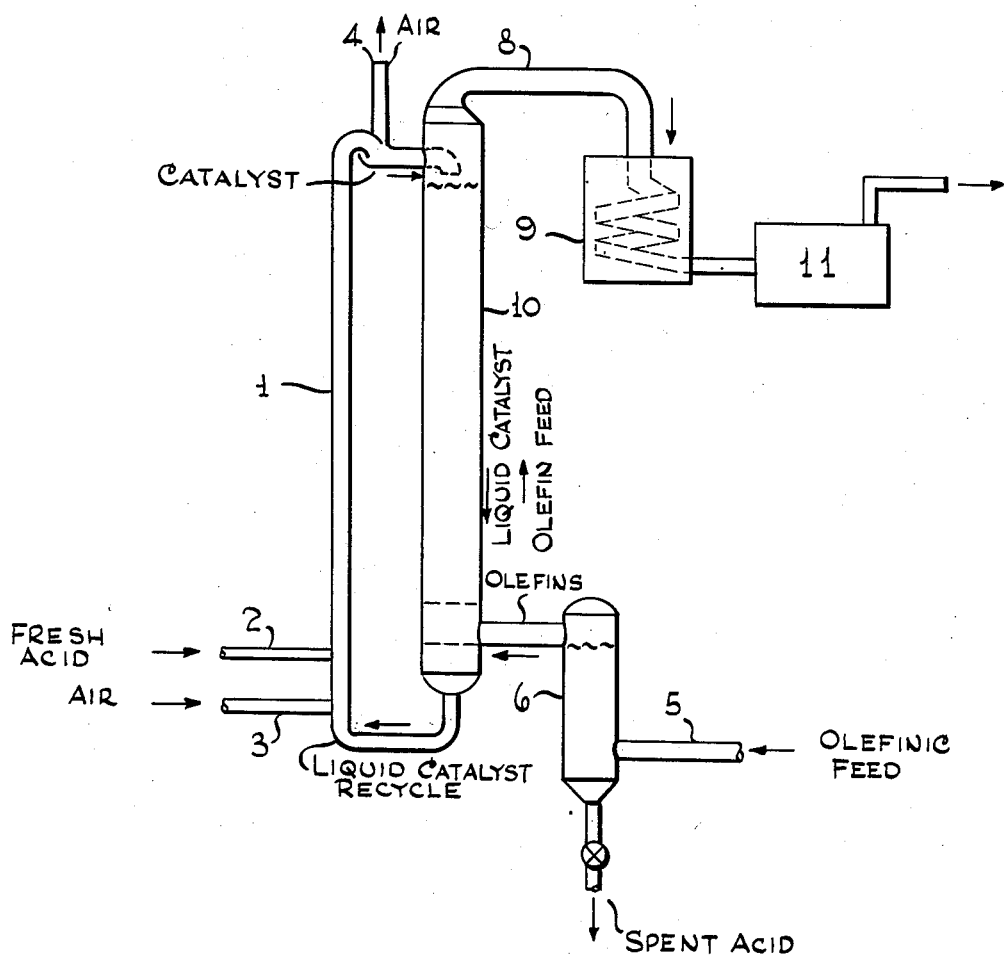
Kenneth K. Kearby Inventor
By W. O. J. Heilman Attorney Patented June 29, 1954

2,682,565

UNITED STATES PATENT OFFICE 2,682,565

METHOD OF POLYMERIZING OLEFINS

Kenneth K. Kearby, Cranford, N. J., assignor to Standard Oil Development Company, a corporation of Delaware Application January 6, 1951, Serial No. 204,727

10 Claims. (Cl. 260—683.15)

The present invention is concerned with an improved process for polymerizing olefins. The invention is more particularly concerned with the polymerization of olefins wherein the olefin containing gases are passed over a liquid catalyst such as an acid of phosphorus which is itself continuously circulated over a suitable packing material. In accordance with the present invention, an olefin polymerization reaction is carried out in a countercurrent reactor in which an acid of phosphorus is passed downwardly as a continuous film over a suitable packing material, while olefin-containing gases and polymer products pass upwardly and are removed from the top of the tower. Operating conditions are maintained in a range which will maintain the feed and all but a negligible amount of high molecular weight polymer in a non-liquid phase which is removed overhead from the reactor without requiring external separation. In accordance with a specific adaptation of the present invention, sufficient acid catalyst is circulated to remove the heat of polymerization in a manner to permit only a small temperature rise in the reactor.

It is well known in the art to use various phosphoric acid type catalysts supported on suitable solid carriers for carrying out chemical reactions. For instance, it is well known in the art to treat olefins and olefin-containing streams with various catalysts, as for example, with acids of phosphorus in order to polymerize the olefins to higher boiling hydrocarbon constituents. In general, the feed streams comprise normally gaseous olefins, such as propylene, butylenes, pentylenes, and mixtures thereof, which are polymerized to hydrocarbon constituents which boil in the range below about 420° F. Although 100% olefinic streams may be utilized as feed stocks, it is generally preferred to have paraffinic diluents present in a concentration in the range of from about 20% to 80% by weight in order to reduce the formation of carbonaceous deposits on the catalyst and to provide better temperature control in the catalyst bed. The phosphoric acid in the catalyst is usually deposited on solid carriers, as for example, kieselguhr, diatomaceous earth, precipitated silica, silica gel, and the like. In general, these catalysts are satisfactory for securing the polymerization of the olefins in the feed stream. However, there exist certain inherent disadvantages with respect to their use in that their structural strength is relatively low, resulting in disintegration of the catalysts and excessive pressure build up, resulting in the necessity for discontinuing the operation. This disintegration of the catalyst is particularly harmful in fixed bed types of operations, especially wherein the catalyst is disposed in relatively long tubular elements having relatively small diameters. In accordance with the present invention, an improved operation is secured by utilizing an acid of phosphorus as the catalyst and by passing the olefins in a countercurrent relationship thereto. The acid itself is continuously circulated as a continuous film downwardly in the reaction zone over solid packing.

The present invention may be readily understood by reference to the drawing illustrating one embodiment of the same. Referring specifically to the drawing, polymerization zone or packed tower 10 is filled with solid material such as quartz, carbon or metal helices such as silver. In accordance with the process, the phosphoric acid is introduced into the gas lift 1 or equivalent means through line 2. Lift gas such as air is introduced into the lift by means of line 3. The acid catalyst is introduced into the top of zone 10 while the lift gas is removed through line 4. The acid flows downwardly as a thin continuous film over the packing in zone 10 under temperature and pressure conditions adapted to secure polymerization of the olefins. The olefin-containing feed gas is introduced into the system through feed line 5 and countercurrently contacts spent acid which is segregated in zone 6. The spent acid is withdrawn from the system by means of line 7 and may be regenerated or discarded as desired. The olefins are introduced into the bottom of zone 10, and, as heretofore pointed out, flow upwardly through zone 10 around the packing in a manner to countercurrently contact the downflowing film of catalyst. In accordance with a specific adaptation of the present invention, the greater portion of the phosphoric acid is recycled through leg 1 and introduced into the top of zone 10 as hereinbefore described. Inert gases, as well as the polymerized product are removed overhead from zone 10 by means of line 8, condensed by passing through a cooling zone 9 and then handled in zone 11 in a manner to segregate the polymerized product.

The invention is broadly concerned with the use of phosphoric acid as a catalyst which is handled in a manner that the olefin-containing gases contact the phosphoric acid as a thin film flowing over solid packing. Operating temperatures and pressures are so selected that the feed and substantially all of the high molecular weight polymers are maintained in a non-liquid phase. Thus, the continuous phase is the gaseous hydrocarbon phase and the extent of contacting is controlled by the type and size of the packing. In other words, the surface of the wetted packing material controls the extent of contacting rather than the size of a bubble in an operation such as when gaseous olefins are bubbled through a continuous phase of acid.

The concentration of the acid employed is preferably in the range from about 90 to 110%. A very desirable acid concentration is in the range from about 100 to 105% equivalent $H_3PO_4$. Thus, a higher concentration of acid can be employed in the present invention due to the fact that the continuous phase is a gaseous hydrocarbon phase. The amount of acid recycled may appreciably depend upon various operating conditions. For instance, if the feed contains less than 50% olefins, a very desirable acid recycle is about 5 volumes of acid per volume of hydrocarbon feed on a liquid basis. For feeds containing more than 50% olefins, the acid recycle should be greater than 10 per volume of hydrocarbon feed and preferably in the range from about 15 to 20.

It is to be understood that the amount of acid recycle will depend upon the quantity necessary in order to control the temperature within the desired range. Temperatures in the range from about 325 to 425° F. are satisfactory, while the preferred temperatures are in the range from 340 to 380° F. A temperature rise of not over 100° F. is preferred and it is very desirable that the temperature rise be not appreciably greater than 50° F. Pressures may vary appreciably, as from atmospheric to 250 lbs. and may be as high as 1000 lbs. and higher. As pointed out heretofore, the particular temperature and pressure selected should be such that essentially all the hydrocarbon product is in the non-liquid phase. This product comprises generally polymers having from about 5 to 9 carbon atoms per molecule.

A very desirable mode of operation is to introduce relatively hot acid into the top of the reactor at a temperature below the top reactor temperature. Thus, for example, if the top of the reactor is in the range from 375 to 425° F., it is preferred to introduce the acid at a somewhat lower temperature, as for example, in the range from 300 to 325° F. Additional acid is introduced at a plurality of points below the top of the reactor at temperatures progressively lower. These temperatures may vary down to 70° F. When employing a multiplicity of points for the introduction of the acid in the manner described, the amount of acid introduced at the respective points, as well as the temperature of the acid introduced at the respective points, will be determined by the reactor temperature so as to approach an isothermal condition within the reactor.

Having described the invention, it is claimed:

1. Process for polymerizing olefins which comprises passing an olefin-containing hydrocarbon stream upwardly through a packed reactor under temperature and pressure conditions adapted to polymerize the olefins and to maintain the hydrocarbons including polymerized product in a non-liquid continuous phase, passing liquid phosphoric acid downwardly in said reactor as a thin continuous film over a solid packing material, removing the polymerized product overhead from said reactor and segregating the polymerized product, withdrawing the acid from the bottom of said reactor and recycling the same to the top of said reactor.

2. Process as defined by claim 1 wherein the concentration of the liquid phosphoric acid is in the range from 90–110%.

3. Process as defined by claim 1 wherein the concentration of the liquid phosphoric acid is in the range from 100–105%.

4. Process as defined by claim 1 wherein the top of said reactor is maintained at a temperature in the range from about 375–425° F. and wherein the acid is introduced into the top of said reactor at a temperature in the range from about 300–325° F.

5. Process as defined by claim 1 wherein the amount of liquid acid recycled is at least five volumes of acid per liquid volume of said hydrocarbon stream whereby the temperature rise in said reactor is not over 100° F.

6. A process as defined by claim 1 wherein spent acid is withdrawn from the reactor and fresh acid is added to said recycled acid.

7. Process as defined by claim 6 wherein said olefin-containing hydrocarbon stream is contacted by said withdrawn liquid spent acid before the stream enters said reactor.

8. Process as defined by claim 4 wherein the acid is introduced into said reactor at a plurality of spaced points.

9. Process as defined by claim 8 wherein the temperatures of the respective acid streams introduced into said reactor decrease in the direction of flow of the acid within said reactor.

10. Process for polymerizing olefins which comprises passing a gaseous hydrocarbon stream containing in the range of 15 to 75% olefins upwardly through a reactor containing solid packing material under temperature and pressure conditions adapted to polymerize in the range of 75 to 100% of the olefins and to maintain the hydrocarbons including polymerized product in a non-liquid continuous phase, passing liquid phosphoric acid catalyst downwardly in said reactor as a thin continuous film over the solid packing material, removing the polymerized product overhead from said reactor, withdrawing acid from the bottom of said reactor and recycling the same to the top thereof, said withdrawn acid being recycled in an amount whereby the temperature of said hydrocarbon stream in said reactor does not rise more than 100° F.

References Cited in the file of this patent

UNITED STATES PATENTS

| Number | Name | Date |
|---|---|---|
| 1,993,512 | Ipatieff | Mar. 5, 1935 |
| 2,186,021 | Holm et al. | Jan. 9, 1940 |
| 2,186,022 | Holm et al. | Jan. 9, 1940 |
| 2,223,268 | Plummer | Nov. 26, 1940 |
| 2,245,143 | Gerhold | June 10, 1941 |
| 2,263,266 | Forney | Nov. 18, 1941 |
| 2,579,433 | Holm et al. | Dec. 18, 1951 |